(12) United States Patent
Berry et al.

(10) Patent No.: US 7,752,475 B2
(45) Date of Patent: Jul. 6, 2010

(54) LATE DATA LAUNCH FOR A DOUBLE DATA RATE ELASTIC INTERFACE

(75) Inventors: Christopher J. Berry, Hudson, NY (US); Jonathan Y. Chen, Marlboro, NY (US); Michael Fee, Cold Spring, NY (US); Patrick J. Meaney, Poughkeepsie, NY (US); Alan P. Wagstaff, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/426,671

(22) Filed: Jun. 27, 2006

(65) Prior Publication Data

US 2007/0300096 A1 Dec. 27, 2007

(51) Int. Cl.
*G06F 13/00* (2006.01)
*G06F 13/42* (2006.01)

(52) U.S. Cl. .................. 713/400; 713/600; 710/100; 710/305

(58) Field of Classification Search .............. 713/400, 713/600; 710/100, 305
See application file for complete search history.

(56) References Cited

U.S. PATENT DOCUMENTS

| | | | |
|---|---|---|---|
| 5,805,872 A | 9/1998 | Bannon | |
| 5,867,541 A * | 2/1999 | Tanaka et al. | 375/354 |
| 5,971,889 A | 10/1999 | Ohashi et al. | |
| 6,114,886 A | 9/2000 | Seo | |
| 6,144,886 A | 11/2000 | Lee | |
| 6,166,563 A | 12/2000 | Volk et al. | |
| 6,170,506 B1 | 1/2001 | Butwin et al. | |
| 6,202,128 B1 | 3/2001 | Chan et al. | |
| 6,263,463 B1 | 7/2001 | Hashimoto | |
| 6,279,073 B1 * | 8/2001 | McCracken et al. | 711/105 |
| 6,282,128 B1 | 8/2001 | Lee | |
| 6,315,692 B1 | 11/2001 | Takahashi et al. | |
| 6,335,955 B1 | 1/2002 | Knotts | |
| 6,373,289 B1 | 4/2002 | Martin et al. | |
| 6,396,322 B1 | 5/2002 | Kim et al. | |
| 6,424,198 B1 | 7/2002 | Wolford | |

(Continued)

OTHER PUBLICATIONS

Non-Final Office Action, Nov. 20, 2008, in U.S. Appl. No. 11/426,675.

(Continued)

*Primary Examiner*—Mark Connolly
(74) *Attorney, Agent, or Firm*—Jon A. Gibbons; Fleit, Gibbons, Gutman, Bongini & Bianco P.L.

(57) ABSTRACT

A double data rate interface in which the set-up interval is extended for a data path in which data is delayed relative to the other data path. Data is latched into a register comprised of mid cycle type latches, such as for example L2* latches. For example, if the delayed half of the data is not available until the second half of the double data rate cycle, the second half of the data is allowed to have a set-up interval around the mid cycle point while the on-chip timing logic launches the least delayed half of the data on the clock edge after it is set up, without waiting for the expiration of the set up interval of the delayed data.

1 Claim, 4 Drawing Sheets

U.S. PATENT DOCUMENTS

| | | | |
|---|---|---|---|
| 6,442,102 B1 | 8/2002 | Borkenhagen et al. | |
| 6,452,865 B1 | 9/2002 | Wolford | |
| 6,473,838 B1 | 10/2002 | Bass et al. | |
| 6,477,592 B1 * | 11/2002 | Chen et al. | 710/52 |
| 6,493,285 B1 | 12/2002 | Wolford | |
| 6,510,503 B2 * | 1/2003 | Gillingham et al. | 711/167 |
| 6,560,669 B1 | 5/2003 | Ryan | |
| 6,584,578 B1 | 6/2003 | Faue | |
| 6,603,706 B1 | 8/2003 | Nystuen et al. | |
| 6,671,753 B2 | 12/2003 | Dreps et al. | |
| 6,715,096 B2 | 3/2004 | Kuge | |
| 6,760,856 B1 | 7/2004 | Borkenhagen et al. | |
| 6,826,113 B2 | 11/2004 | Ellis et al. | |
| 6,832,294 B2 | 12/2004 | Wicki et al. | |
| 6,838,712 B2 | 1/2005 | Stubbs | |
| 6,874,097 B1 | 3/2005 | Aliahmad et al. | |
| 6,907,493 B2 | 6/2005 | Ryan | |
| 6,912,628 B2 | 6/2005 | Wicki et al. | |
| 6,914,829 B2 | 7/2005 | Lee | |
| 6,920,576 B2 | 7/2005 | Ehmann | |
| 7,017,067 B2 | 3/2006 | Zielbauer | |
| 7,089,440 B2 | 8/2006 | Wu | |
| 7,135,854 B2 | 11/2006 | Brian et al. | |
| 7,138,844 B2 * | 11/2006 | Lee et al. | 327/276 |
| 7,225,354 B2 * | 5/2007 | Tseng | 713/503 |
| 7,295,489 B2 * | 11/2007 | Yoon et al. | 365/233.12 |
| 7,376,021 B2 | 5/2008 | Heo et al. | |
| 7,412,618 B2 * | 8/2008 | Ferraiolo et al. | 713/600 |
| 7,440,531 B2 | 10/2008 | Dreps et al. | |
| 2001/0046163 A1 | 11/2001 | Yanagawa | |
| 2002/0018395 A1 | 2/2002 | McLaury | |
| 2002/0130795 A1 | 9/2002 | Moon | |
| 2003/0001651 A1 | 1/2003 | La Rosa | |
| 2003/0043926 A1 * | 3/2003 | Terashima et al. | 375/257 |
| 2003/0065908 A1 | 4/2003 | Patel et al. | |
| 2003/0085734 A1 | 5/2003 | Nguyen | |
| 2003/0217214 A1 | 11/2003 | Calvignac et al. | |
| 2004/0008906 A1 | 1/2004 | Webb | |
| 2004/0071171 A1 | 4/2004 | Ghiasi | |
| 2004/0089069 A1 | 5/2004 | Weber et al. | |
| 2004/0098551 A1 | 5/2004 | Heo et al. | |
| 2004/0117742 A1 | 6/2004 | Emberling et al. | |
| 2004/0123173 A1 | 6/2004 | Emberling et al. | |
| 2004/0148538 A1 | 7/2004 | Li et al. | |
| 2004/0174765 A1 | 9/2004 | Seo et al. | |
| 2004/0239388 A1 | 12/2004 | Harrison et al. | |
| 2004/0260962 A1 | 12/2004 | Suen et al. | |
| 2005/0001655 A1 | 1/2005 | Takeda | |
| 2005/0050289 A1 | 3/2005 | Raad | |
| 2005/0105349 A1 | 5/2005 | Dahlberg et al. | |
| 2005/0114724 A1 | 5/2005 | Wu | |
| 2005/0141331 A1 | 6/2005 | Cho | |
| 2005/0157827 A1 | 7/2005 | Yoon | |
| 2005/0162187 A1 | 7/2005 | Nguyen | |
| 2005/0182187 A1 | 7/2005 | Nguyen | |
| 2005/0174145 A1 | 8/2005 | Dosho et al. | |
| 2005/0195928 A1 | 9/2005 | Yamazaki | |
| 2007/0300095 A1 * | 12/2007 | Fee et al. | 713/400 |
| 2007/0300098 A1 * | 12/2007 | Chen et al. | 713/401 |
| 2007/0300099 A1 * | 12/2007 | Chen et al. | 713/500 |

OTHER PUBLICATIONS

Non-Final Office Action, Nov. 25, 2008, in U.S. Appl. No. 11/426,648.
Non-Final Office Action, Dec. 11, 2008, in U.S. Appl. No. 11/426,651.
Non-Final Office Action, Dec. 16, 2008, in U.S. Appl. No. 11/426,666.
Non-Final Office Action, Dec. 18, 2008, in U.S. Appl. No. 11/426,671.
Final Office Action, Apr. 23, 2009, in U.S. Appl. No. 11/426,675.
Final Office Action, Jun. 3, 2009, in U.S. Appl. No. 11/426,651.
Final Office Action, Jun. 15, 2009, in U.S. Appl. No. 11/426,648.
Non-Final Office Action, Aug. 13, 2009, in U.S. Appl. No. 11/426,675.

* cited by examiner

LATE DATA LAUNCH FOR A DOUBLE DATA RATE ELASTIC INTERFACE

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: Early Directory Access of a Double Rate Elastic Interface, application Ser. No. 11/426,675; Programmable Bus Driver Launch Delay/Cycle Delay to Reduce EI Elasticity Requirements, application Ser. No. 11/426,666; Mechanism for Windaging of a Double Rate Driver, application Ser. No. 11/426,648; Double Data Rate Chaining on Elastic Interfaces, application Ser. No. 11/426,651.

FIELD OF THE INVENTION

This invention relates to a system an method for implementing a double data rate bus, and more particularly to an improved system and method for implementation of a double data rate bus coupling chips via an elastic interface.

BACKGROUND OF THE INVENTION

In digital data systems in general and in computer systems in particular, there is an ever-increasing drive for larger bandwidth and higher performance. These systems are comprised of discreet integrated circuit chips that are interconnected by a bus. Data moves through a chip and between chips in response to clock pulses, which are intended to maintain synchronization of the data in parallel paths. At the extremely high data rates in today's systems, variations in the propagation of data over a bus along one path as compared to another path on the bus (i.e. skew) can exceed one clock cycle. U.S. Pat. No. 6,334,163, which is assigned to the assignee of this application and is incorporated herein by reference, discloses a so called Elastic Interface (EI) that can compensate for bus skew greater than one clock cycle without a performance penalty. Never the less, packaging technology has not been able scale up to match the performance and bandwidth of the chip and interface technologies. In order to reduce the number of I/O terminals on a chip and the number of conductive paths in a bus between chips, the prior art transfers data using a so called Double Data Rate (DDR), in which data is launched onto the bus at both the rising and falling edges of the clock. This allows the same amount of data to be transferred (i.e. bandwidth) with only half the number of bus conductors and half the number of I/O ports, as compared with a system where data is launched only on a rising or falling clock edge.

FIG. 1 illustrates a prior art system in which data is transferred from a chip to a bus via a double data rate interface. Here the clock synchronous data is comprised of one word from Bitstack 0 and one from Bitstack 1. The output of the each bitstack is coupled as an input to a bitstack register 10 comprised of master-slave latches 11. The output of one word of the register 10 is coupled as input to a multiplexer 12 whose output is coupled to a double data rate bus 14 via an I/O port on the chip. The output of the other word of the register 10 is coupled as an input to a master latch register 16 whose output is coupled as input to multiplexer 12. A select input to the multiplexer, operating at the local clock frequency, couples one half of the register 10 outputs to the I/O port for one clock edge and the other half of the register 10 outputs, through master latch register 16, to the I/O port on the next clock edge. That is, for example, one edge of the clock signal selects Bitstack 0 data to launch onto the bus, and the other edge selects corresponding data from Bitstack 1.

FIG. 2 is a timing diagram illustrating the timing used in the prior art implementation of this double data rate interface. In the prior art system design, time must be allowed for the data to set-up in the register prior to selection of any data by the double data rate select input to the multiplixer. That is, time for the elements that comprise the register to assume a stable state after the input changes. Here it should be noted that the prior art requires Bitstack 0 and Bitstack 1 data to set up in the register 10 prior to launching either Bitstack 0 or Bitstack 1 data from the register 10. Following this set-up time interval for the last to arrive data the multiplexer, in response to the select signal timed to one edge of the local clock signal, the multiplexer couples half the contents of the register (e.g. the data from Bitstack 0) to the bus via an I/O port and the next edge transfers the other half (e.g. the data from Bitstack 1). There is a possibility that the transmission delay in the path from one Bitstack will be longer than the delay in the path from the other Bitpath. In FIG. 1 this is illustrated by making the path from Bitstack 1 longer than the path from Bitstack 0. FIG. 2 shows data from both bit stacks (A0, B0, A1, B1 . . . Near End) launched on a rising edge of the C2 clock at the same time. Due to the relatively longer path of Bitstack 1, the simultaneously launched data A1, B1, C1, . . . is delayed with respect to A0, B0, C0 . . . at the register 10 (Far End). The solid black line represents a time when the Bitstack 0 data is setup in the register 10 and could be launched by a select following the falling edge of the C2 clock. However, the Bitstack 1 data is not yet set up in the register 10, and therefore the Bitstack 0 data is not launched until a half cycle later represented by the dotted line, and Bitstack 1 data another half cycle after that. The final waveform shows the launch times of the A0, A1, B0, B1, C0, C1 . . . data onto the double data rate bus. Notice the A0 data is not launched until after the time denoted by the dotted line.

SUMMARY OF THE INVENTION

An object of this invention is the provision of a system and method for operating a double data rate bus that eliminates the need for a half cycle delay where there is a delay in the availability of one half of the data.

Briefly, this invention contemplates the provision of a double data rate interface in which the set-up interval is extended for a data path in which data is delayed relative to the other data path. Data is latched into a register comprised of mid cycle type latches, such as for example L2* latches. For example, if the delayed half of the data is not available until the second half of the double data rate cycle, the second half of the data is allowed to have a set-up interval around the mid cycle point while the on-chip timing logic launches the least delayed half of the data on the clock edge after it is set up, without waiting for the expiration of the set up interval of the delayed data.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings, in which:

DETAILED DESCRIPTION OF THE INVENTION

Figure 1:
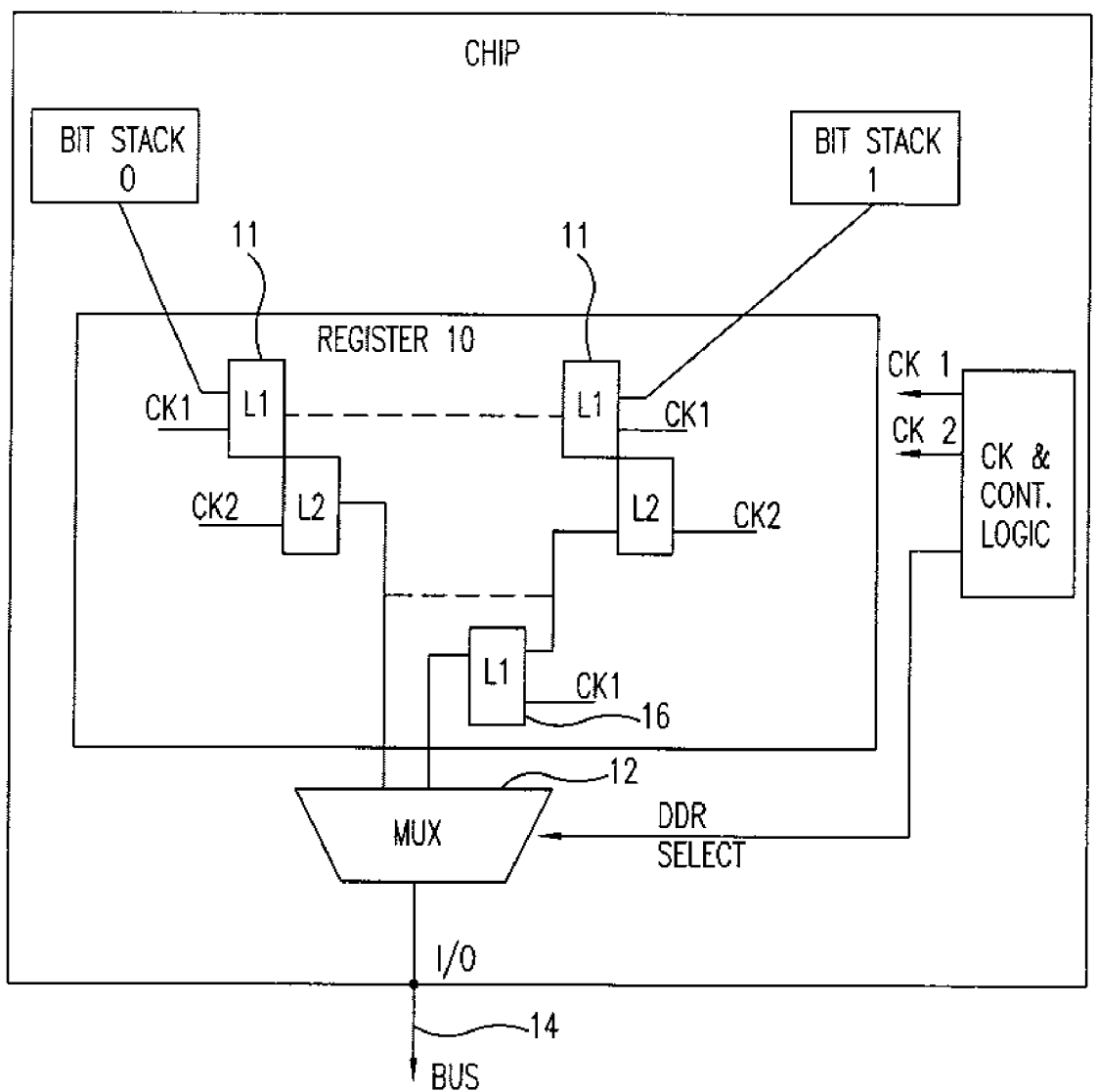
FIG. 1 is a block diagram of a typical prior art system to which this invention applies.
Figure 3:
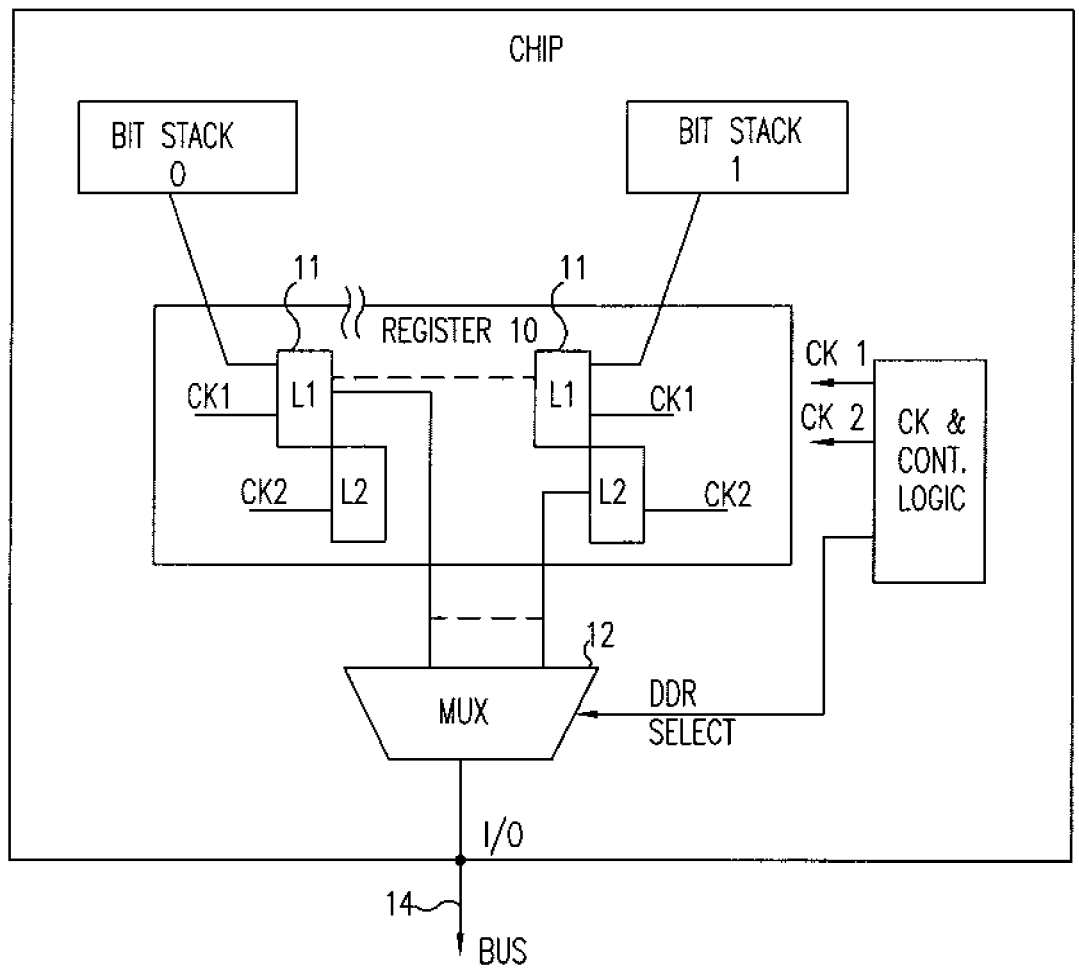
FIG. 3 is a block diagram similar to FIG. 1 in accordance with the teachings of this invention.
Figure 4:
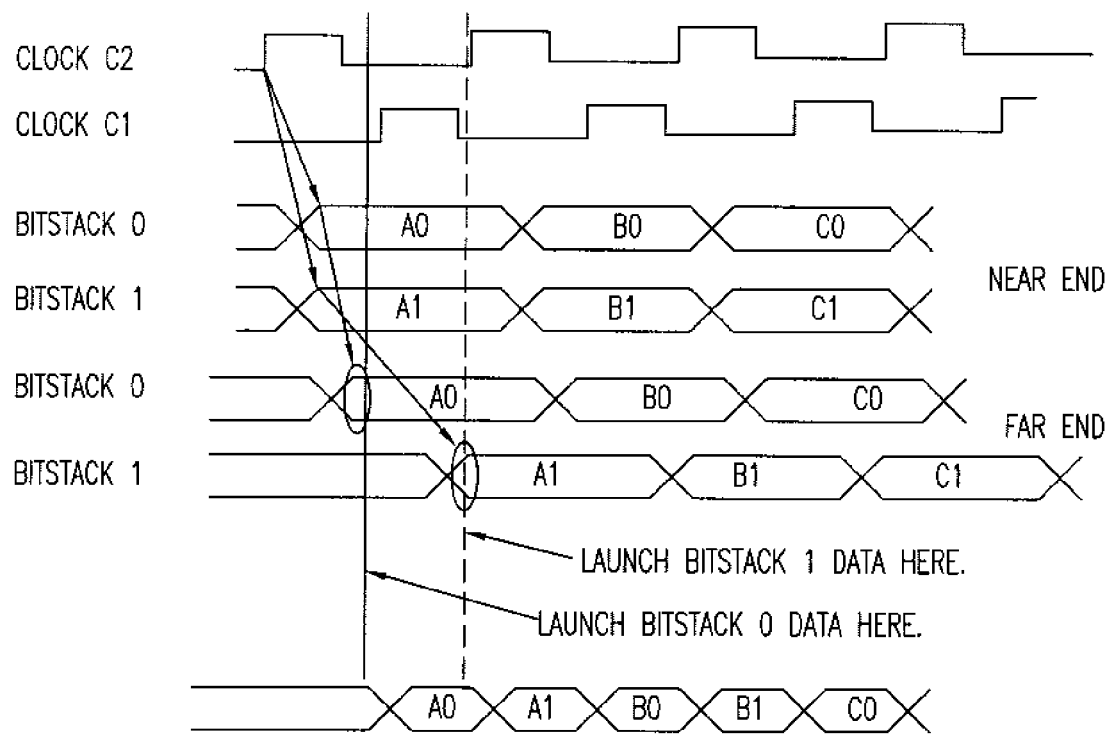
FIG. 4 is a timing diagram for the operation of FIG. 3 in accordance with the teaching of this invention.

Referring now to FIGS. 3 and 4 of the drawings, FIG. 3 is similar at this block diagram level to FIG. 1. Again the clock synchronous data is comprised one half from Bitstack 0 and one half from Bitstack 1.

As with the prior art, each bitstack is coupled as an input to a bitstack register 10 comprised of master-slave latches 11. However, the master of one word output is coupled directly as input to multiplexer 12. The other slave of the other word output is coupled as input to the multiplexer 12. There is no need for master latch register 16 from the prior art. A select input to the multiplexer, operating at the local clock frequency, couples one half of the register 10 master outputs to the I/O port for one clock edge and the other half of the register 10 outputs to the I/O port on the next clock edge. That is, for example, one edge of the clock signal selects Bitstack 0 data to launch onto the bus, and the other edge selects corresponding data from Bitstack 1.

Figure 2:
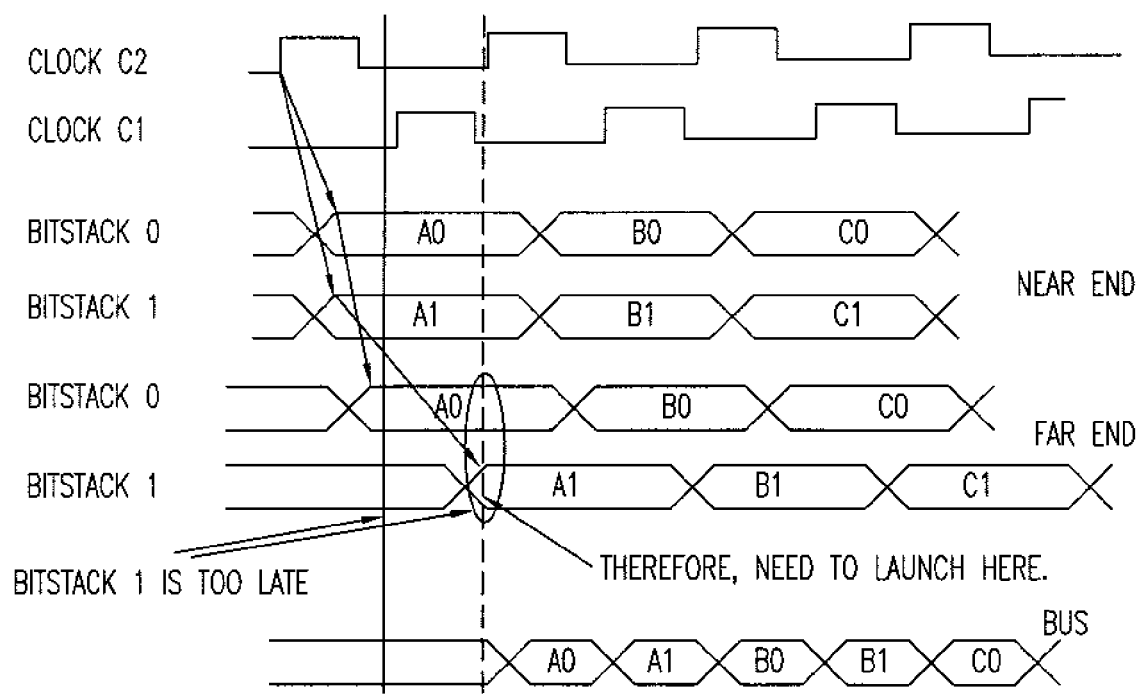
FIG. 2 is a timing diagram for the operation of the system of FIG. 1 in accordance with the teachings of the prior art.

FIG. 4 is a timing diagram illustrating the operation of the late data launch driver for a double data rate elastic interface in accordance with the teachings of this invention. Again, as in FIG. 2, it is assumed that the data from Bitstack 1 is delayed with respect to the data from Bitstack 0. However, here the timing and control logic launches the Bitstack 0 data on the next falling edge of the double data rate select clock signal since the setup interval for this data has elapsed even though the set up interval for the Bitstack 1 data has not elapsed. The set-up interval for the Bitstack 1 data will have elapsed prior to the next rising edge, and this data is launched on this next edge. The final waveform shows the launch times of the A0, A1, B0, B1, C0, C1 . . . data onto the double data rate bus. Notice the A0 data is launched after the time denoted by the solid line, compared to being launched following the time denoted by the dotted line for the prior art, thus improving the latency of the elastic interface.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. An interface chip that interfaces synchronous data that is comprised of two parts, one half from one bit stack (Bitstack 0) and the other half from another bit stack (Bitstack 1) to a double data rate bus, comprising in combination;

a master latch stage having its input connected to said Bitstack 0 and its output directly connected to one input of a multiplexer whose output is coupled to said double data rate bus via an I/O port on the chip;

a master-slave L1-L2 latch having its master L1 stage input connected to said Bitstack 1 and its slave L2 stage output connected directly to another input of said multiplexer;

clock and control logic generating a local clock signal comprised of a CK1 clock signal of one phase, a CK2 clock signal of opposite phase, and a multiplexer select signal that selects the output of the master latch connected to Bitstack 0 on one edge of a double data rate select clock signal operating at the local clock signal frequency, and selects the output of the output of the slave L2 stage connected to Bitstack 1 on the other edge of the double data rate select clock signal;

latching the one half from Bitstack 0 in the master latch stage in response to the CK1 clock signal, also latching the other half from Bitstack 1 in the master L1 stage in response to the CK1 clock signal, and latching the other half from Bitstack 1 latched in the master L1 stage in the slave L2 stage in response to the CK2 clock signal;

launching the one half from Bitstack 0 on the double data rate bus from the master latch stage on the next edge of the double data rate select clock signal following the CK1 clock signal and launching the other from the Bitstack 1 on the double data rate bus from the master L1 stage on the following next edge of the double data rate select clock signal.

* * * * *